(12) United States Patent
Landphair et al.

(10) Patent No.: US 9,675,004 B2
(45) Date of Patent: Jun. 13, 2017

(54) SOIL MOISTURE-BASED PLANTER DOWNFORCE CONTROL

(71) Applicant: Deere & Company, Moline, IL (US)

(72) Inventors: Donald K. Landphair, Moline, IL (US); Michael E. Frasier, Iowa City, IA (US); James Z. Liu, Moline, IL (US); Jason D. Walter, Bettendorf, IA (US); Lawrence D. Green, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/871,476

(22) Filed: Sep. 30, 2015

(65) Prior Publication Data

US 2017/0086361 A1    Mar. 30, 2017

(51) Int. Cl.
*A01C 7/20* (2006.01)
*A01C 5/06* (2006.01)

(52) U.S. Cl.
CPC .............. *A01C 7/205* (2013.01); *A01C 5/062* (2013.01); *A01C 5/068* (2013.01); *A01C 7/203* (2013.01)

(58) Field of Classification Search
CPC ................................ A01C 5/062; G05B 15/02
See application file for complete search history.

(56) References Cited

U.S. PATENT DOCUMENTS 7,630,806 B2 * 12/2009 Breed ................. B60R 21/0134
                                                         180/273
8,522,889 B2    9/2013  Adams et al.
8,924,092 B2   12/2014  Achen et al.
9,232,687 B2    1/2016  Bassett
(Continued)

FOREIGN PATENT DOCUMENTS

WO    2013066652    5/2013
WO    2014153157    9/2014
(Continued)

OTHER PUBLICATIONS

Hanna, et. al., Applied Engineering in Agriculture, vol. 26(4): pp. 551-556, (2010) American Society of Agricultural and Biological Engineers ISSN 0883-8542.
(Continued)

*Primary Examiner* — Thomas Tarcza
*Assistant Examiner* — Alex C Dunn
(74) *Attorney, Agent, or Firm* — Michael Best & Friedrich LLP

(57) ABSTRACT

A seeding machine includes a main frame, and a row unit coupled to the main frame. The row unit has a row unit frame, a gauge wheel coupled to the row unit frame, and a furrow opener coupled to the row unit frame, the furrow opener having a stationary or rotating surface that contacts and moves soil. The row unit also includes a furrow closer, the furrow closer having a stationary or rotating surface that contacts and presses soil. The seeding machine also includes a downforce adjustment system for adjusting an amount of downforce applied to the row unit, the downforce adjustment system including a moisture sensor, a controller configured to receive a signal from the moisture sensor, and an actuator configured to change the amount of downforce applied to the row unit based on the signal received by the controller.

17 Claims, 2 Drawing Sheets

(56) References Cited

U.S. PATENT DOCUMENTS

| | | | |
|---|---|---|---|
| 2009/0164067 A1* | 6/2009 | Whitehead | A01B 79/005 701/41 |
| 2011/0126746 A1* | 6/2011 | Borland | A01C 5/04 111/149 |
| 2012/0083907 A1* | 4/2012 | Motavalli | G06Q 10/0631 700/90 |
| 2014/0303854 A1 | 10/2014 | Zielke | |
| 2014/0379228 A1* | 12/2014 | Batcheller | A01C 21/005 701/50 |
| 2015/0066932 A1* | 3/2015 | Stuber | G06Q 50/02 707/737 |
| 2015/0105965 A1* | 4/2015 | Blackwell | A01B 59/002 701/28 |
| 2015/0264857 A1 | 9/2015 | Achen et al. | |
| 2015/0289441 A1 | 10/2015 | Arnett et al. | |
| 2015/0296698 A1 | 10/2015 | Schumacher et al. | |
| 2016/0037709 A1* | 2/2016 | Sauder | A01C 7/203 700/275 |
| 2016/0116632 A1 | 4/2016 | Stoller et al. | |
| 2016/0338260 A1 | 11/2016 | Hahn et al. | |

FOREIGN PATENT DOCUMENTS

| | | |
|---|---|---|
| WO | 2015143433 | 9/2015 |
| WO | 2015171908 A1 | 11/2015 |

OTHER PUBLICATIONS

EP16190940.3 Extended European Search Report dated Feb. 7, 2017 (9 pages).

Office Action from the United States Patent and Trademark Office for U.S. Appl. No. 14/871,458 dated Jan. 13, 2017 (12 pages).

* cited by examiner

SOIL MOISTURE-BASED PLANTER DOWNFORCE CONTROL

BACKGROUND

The present disclosure relates to systems and methods for planting seeds, in particular with a row crop planter.

Various factors affect crop yields. Such factors include, for example, seed depth, seed spacing, soil compaction, soil moisture, tillage condition, soil nutrients, and soil type. A productive crop yield is typically one that grows and emerges uniformly from the soil.

SUMMARY

In one aspect, the disclosure provides a seeding machine that includes a main frame, and a row unit coupled to the main frame. The row unit has a row unit frame, a gauge wheel coupled to the row unit frame, and a furrow opener coupled to the row unit frame, the furrow opener having a stationary or rotating surface that contacts and moves soil. The row unit also includes a furrow closer coupled to the row unit frame, the furrow closer having a stationary or rotating surface that contacts and presses soil. The seeding machine also includes a downforce adjustment system for adjusting an amount of downforce applied to the row unit, the downforce adjustment system including a moisture sensor configured to detect a moisture level of soil, a controller configured to receive a signal from the moisture sensor corresponding to the detected moisture level, and an actuator configured to change the amount of downforce applied to the row unit based on the signal received by the controller.

In another aspect, the disclosure provides a seeding machine that includes a controller having a processor configured to detect a moisture level with a moisture sensor coupled to a row unit on the seeding machine, determine whether the moisture level is above a predetermined threshold, and in response to determining that the moisture level is above a predetermined threshold, decrease a downforce on the row unit.

In another aspect, the disclosure provides a seeding machine that includes a main frame, and a row unit coupled to the main frame. The row unit has a row unit frame. The seeding machine also includes a downforce adjustment system coupled to the row unit for adjusting an amount of downforce applied to the row unit. The downforce adjustment system includes a moisture sensor coupled to the row unit and configured to detect a moisture level of one or more layers of soil, the moisture sensor selected from a group consisting of a capacitive sensor, an infrared sensor, and a radar sensor. The downforce adjustment system also includes a controller configured to receive a signal from the moisture sensor corresponding to the detected moisture level, and an actuator configured to change the amount of downforce applied to the row unit based on the signal received by the controller. The actuator includes an air bag and an air source coupled to the air bag, the air source configured to provide air to the air bag. The downforce adjustment system also includes a linkage coupled to each of the air bag, the row unit frame, and the main frame, wherein the linkage is pivotally coupled to the main frame.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
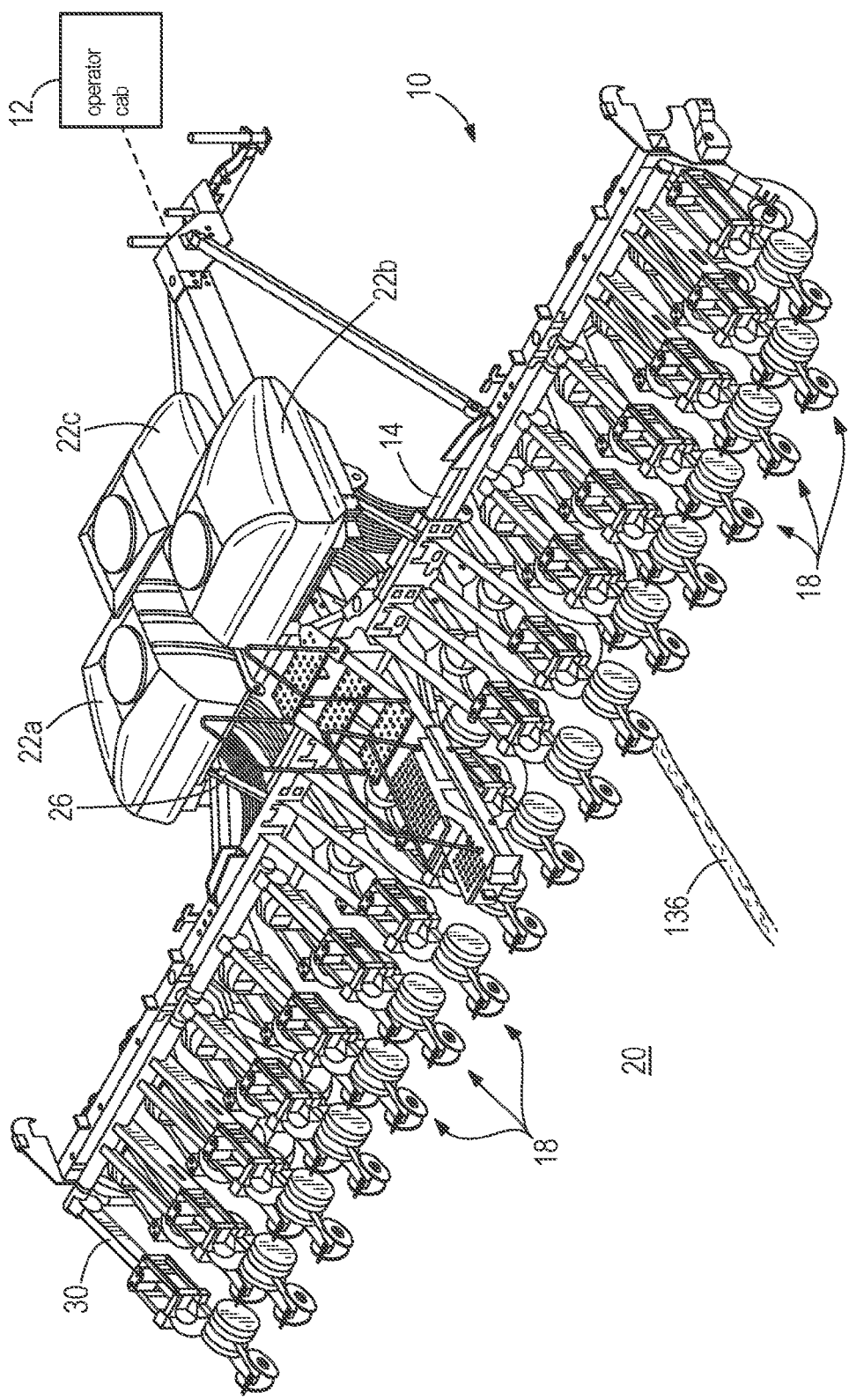
FIG. 1 is a partially schematic perspective view of a seeding machine.

FIG. 1 illustrates a seeding machine 10 (e.g., a row crop planter). The seeding machine 10 includes a main frame 14 and is pulled behind a tractor (not shown) having an operator's cab 12 (shown schematically). A plurality of individual row units 18 are coupled (e.g., mounted) on a rear portion of the main frame 14, such that the row units 18 are pulled over a layer of soil 20. Seed sources, such as storage tanks 22a-22c, are coupled to the main frame 14, and hold seed that is delivered, e.g., pneumatically or in any other suitable manner, to a mini-hopper (not shown) on each row unit 18. The storage tanks 22a-22c are coupled to the mini-hoppers by way of conduits 26, such as hoses, and a pressurized delivery apparatus (not shown). Each storage tank 22a-22c contains the same or different varieties of seed to be planted in the soil 20. Each row unit 18 is connected to a conduit 26 such that each row unit 18 is coupled to a storage tank 22a-22c to receive seed. As illustrated in FIG. 1, each row unit 18 further includes its own frame 30, to which various components (e.g., a furrow opener, a furrow closer, etc.) are mounted.

Figure 2:
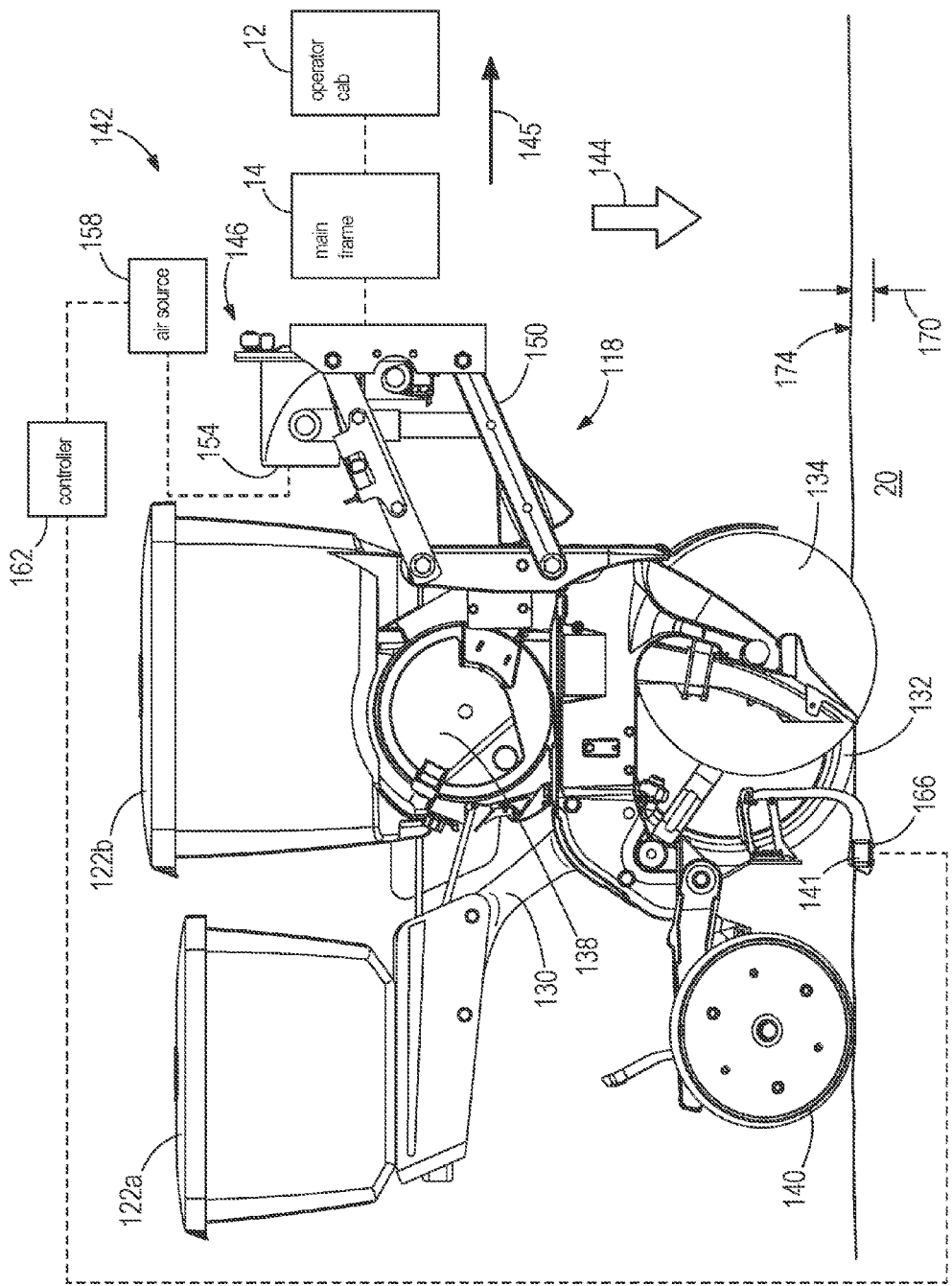
FIG. 2 is a partially schematic side view of a row unit for the seeding machine of FIG. 1.

FIG. 2 illustrates an example of a row unit 118 that may be used in place of one of the row units 18 in FIG. 1. Similar to the row unit 18, the row 118 is also coupled to the main frame 14. In some constructions, a plurality of row units 118 are coupled to the main frame 14, similar to the row units 18 in FIG. 1.

As illustrated in FIG. 2, each row unit 118 includes its own hoppers 122a, 122b that hold chemical and seed respectively rather than receiving seed from bulk storage as in the construction illustrated in FIG. 1. The hoppers 122a, 122b are coupled to a row unit frame 130. Each row unit 118 also includes a gauge wheel (or wheels) 132 coupled to the row unit frame 130 that contacts and rolls along the soil 20, and a furrow opener 134 (e.g., an opening wheel or blade or other structure having a stationary or rotating surface that contacts and moves soil away to form a furrow) coupled to the row unit frame 130 for forming a furrow 136 (see FIG. 1) in the soil 20. A seed metering device 138 coupled to the row unit frame 130 receives seeds from hopper 122b and meters and dispenses the seeds into the furrow 136. A furrow closer 141 (e.g., a closing and packing wheel or wheels or other structure having a stationary or rotating surface that contacts and presses soil) coupled to the row unit frame 130 pushes soil around the seeds to close the furrow 136. In the illustrated construction, each row unit 118 also includes a seed firmer device 141 coupled to the row unit frame 130 forward of the closer 141 that firms each seed and pushes it into the opened furrow 136.

With continued reference to FIG. 2, the row unit 118 further includes a downforce adjustment system 142. The downforce adjustment system 142 adjusts an amount of downforce that is applied to the row unit 118 (e.g., to the gauge wheel or wheels 132) to control a seed planting depth. Downforce refers to an amount of force applied downwardly (see the arrow 144 in FIG. 2) in a direction perpendicular relative to the soil 20 and to a direction of movement 145 of the seeding machine 10.

The downforce adjustment system 142 includes an actuator 146 that when activated changes the downforce on the row unit 118. In the illustrated construction, a linkage 150 couples the row unit 118 to the main frame 14. A downforce actuator 146 is coupled to main frame 14 and the linkage 150. When activated, the actuator 146 drives the linkage 150 downwardly, causing an increase in downforce on the row unit frame 130 and on the overall row unit 118. When the downforce is increased, the downforce presses the gauge wheel 132 into the soil 20. Thus, when the downforce is increased, the resulting planted seeds are typically planted at a deeper depth. Conversely, when the downforce is decreased, the resulting planted seeds are typically planted at a shallower depth. In some constructions the actuator 146 may be double acting and can provide an up-force to lift the row unit if the row unit weight is more needed for the conditions.

In the illustrated construction, the actuator 146 is a pneumatic actuator that includes an air bag 154 and an air source 158 (e.g., a compressor, a motor, etc.). The air source 158 may be located on the row unit 118 itself, on the main frame 14, or on the towing tractor. When the actuator 146 is activated, the force applied to the linkage 150 rotates the linkage downward relative to the main frame 14 (counterclockwise in FIG. 2), causing the gauge wheel 132 to press down more firmly into the soil 20 below.

In some constructions, the actuator 146 is a hydraulic actuator (e.g., including a hydraulic cylinder and rod coupled to the main frame 14 and to the linkage 150 to change the downforce on the row unit 118), a pneumatic actuator (e.g., including an extendable rod coupled to the main frame 14 and linkage 150 to move the row unit frame 130 downward and change the downforce on the row unit 118), a motorized actuator, or any other type of actuator that when activated changes a downforce on the row unit 118.

With continued reference to FIG. 2, the downforce adjustment system 142 further includes a controller 162 and at least one moisture sensor 166. The controller 162 includes a processor, and is coupled to and communicates with both the actuator 146 (e.g., the pressure source 158 of the actuator 146) and the moisture sensor 166. In some constructions, the controller 162 is mounted to one of the row units 118 itself, on the main frame 14, or on the operator's cab 12. In some constructions, the controller 162 is disposed remotely from the row unit 118, the main frame 14, and the operator's cab 12. In the illustrated construction, the controller 162 communicates wirelessly with both the actuator 146 and the moisture sensor 166. In other constructions, one or more wired connections are used.

The moisture sensor 166 detects levels of moisture in the soil 20 beneath the seeding machine 10 as the seeding machine 10 moves over the soil 20. In some constructions, the moisture sensor 166 detects a level of moisture at a specified depth 170 below a top surface 174 of the soil 20 (e.g., at a predetermined, or default, planting depth). In the illustrated construction, the moisture sensor 166 is mounted to the seed firmer device 141. In other constructions, the moisture sensor 166 is coupled to another area of the seeding machine 10, such as to the main frame 14, to the towing tractor, or to another area on the row unit 118. In some constructions, the moisture sensor 166 is positioned to detect moisture of approaching soil ahead of the furrow opener 134 (i.e., to the right of the furrow opener 134 in FIG. 2, along the direction of movement 145). In some constructions, the seeding machine 10 includes a plurality of row units 118, each having its own moisture sensor or sensors 166. The moisture sensors 166 may be any of a variety of types of sensors, including capacitive sensors in contact with the soil 20, infrared sensors, or radar sensors.

With continued reference to FIG. 2, in the illustrated construction the moisture sensor 166 sends a signal (e.g., a continuous signal or signals) corresponding to the moisture level of the soil 20 to the controller 162. The controller 162 is programmed to receive the signal or signals from the moisture sensor 166 and to determine whether or not to actuate the actuator 146 and change the downforce (i.e., increase the downforce or decrease the downforce) on the row unit 118.

It is desirable for seeds to be planted at depths and in moisture conditions that result in optimal growth and emergence. In the illustrated construction, if the moisture sensor 166 detects high levels of moisture in the soil 20 (e.g., moisture levels above a predetermined threshold), the controller 162 sends a signal to the actuator 146 to decrease the downforce on the row unit 118 and allowing the linkage 150 and the row unit overall 118 to rise. Conversely, if the moisture sensor 166 detects low levels of moisture in the soil 20 (e.g., moisture levels below a predetermined threshold), the controller 162 sends a signal to the actuator 146 to increase the downforce on the row unit 118 and causing the linkage 150 and the row unit overall 118 to lower. In some constructions, the amount of change of the downforce is proportional to the amount of detected moisture. For example, in some constructions the higher the detected moisture content in the soil 20, the smaller the downforce applied by the downforce adjustment system 142. Conversely, the lower the detected moisture content of the soil 20, the higher the downforce applied by the downforce adjustment system 142.

Other constructions include different correlations between the downforce and the measured moisture level. However, at least with respect to corn, it has been found that in moist soil conditions corn generally emerges more rapidly with a lower downforce, and in drier soil conditions corn generally emerges more rapidly with a higher downforce. In some constructions, a farmer may have three or more different types of fields, each having its own separate soil moisture level, or a single field with varying soil moisture levels. Thus, the system and controls described above advantageously provide a farmer with options for causing faster emergence and growth in each type of soil than would otherwise be expected.

With continued reference to FIG. 2, in some constructions the moisture sensor 166, the controller 162, and the actuator 146 form a closed loop, such that the moisture sensor 166 continuously monitors moisture levels in the soil 20 and sends signals to the controller 162, and the actuator 146 continuously adjusts a downforce on the row unit 118 based on signals from the controller 162. This ensures that the planting depths for each seed planted by the row unit 118 are continuously adjusted as needed to ensure desired plant emergence.

For example, in some constructions the moisture sensor 166 detects a level of moisture in the soil 20. If the controller 162 determines that the moisture level is above a predetermined threshold the downforce is decreased. After decreasing the downforce, if the moisture sensor 166 then detects that the moisture level has fallen below the predetermined threshold, the downforce is then increased.

Conversely, in some constructions if the controller 162 determines that the moisture level is below a predetermined threshold the downforce is increased. After increasing the downforce, if the moisture sensor 166 then detects that the moisture level has risen above the predetermined threshold, the downforce is then decreased.

Other constructions include an open loop system, in which the controller 162 provides a signal or signals to a user (e.g., via a user interface on the operator's cab 12) from the moisture sensor 166, and the user must determine whether or not to manually activate the actuator 146 to change the downforce on the row unit 118.

In some constructions, the seeding machine 10 includes a plurality of row units 118. Each of the row units 118 includes its own associated actuator 146. The actuators 146 are coupled to a single controller 162, such that the single controller 162 controls each of the associated actuators 146 individually.

In some constructions, the moisture sensor 166 is one of a plurality of moisture sensors 166 that are each coupled to a single controller 162. Each moisture sensor 166 is associated with a different row unit 118.

In some constructions, each of the row units 118 includes its own associated controller 162, its own associated moisture sensor 166, and its own associated actuator 146, such that each controller 162 only communicates with the moisture sensor 166 and the actuator 146 associated with a particular row unit 118.

In some constructions, only a single moisture sensor 166 is used for the entire seeding machine 10, and the downforce for all of the row units 118 is identical for each row unit 118, based on the moisture level detected by the single moisture sensor.

In some constructions, one moisture sensor 166 is used for a section on the machine 10 and the downforce for all the row units 118 on each section is identical based on the moisture level detected by the single moisture sensor for that section.

Various features and advantages of the disclosure are set forth in the following claims.

What is claimed is:

1. A seeding machine comprising:
   a main frame;
   a row unit coupled to the main frame, the row unit having a row unit frame, a gauge wheel coupled to the row unit frame, and a furrow opener coupled to the row unit frame; and
   a downforce adjustment system for adjusting an amount of downforce applied to the row unit, the downforce adjustment system including a moisture sensor configured to detect a moisture level of soil, a controller configured to receive a signal from the moisture sensor corresponding to the detected moisture level, and an actuator configured to change the amount of downforce applied to the row unit based on the signal received by the controller,
   wherein the row unit is one of a plurality of row units coupled to the main frame, and wherein each of the row units includes its own associated controller, its own associated moisture sensor, and its own associated actuator, such that each controller only communicates with the moisture sensor and the actuator associated of a single row unit.

2. The seeding machine of claim 1, wherein the moisture sensor is coupled to the row unit.

3. The seeding machine of claim 2, further comprising a seed firmer device coupled to the row unit frame, wherein the moisture sensor is coupled to the seed firmer device.

4. The seeding machine of claim 1, wherein the seeding machine has a direction of travel, and wherein the moisture sensor is positioned to detect the moisture level of approaching soil ahead of the furrow opener along the direction of travel.

5. The seeding machine of claim 1, wherein the moisture sensor is selected from a group consisting of a capacitive sensor, an infrared sensor, and a radar sensor.

6. The seeding machine of claim 1, wherein the moisture sensor detects a moisture level at a predetermined depth within soil.

7. The seeding machine of claim 1, wherein the actuator is a pneumatic or hydraulic actuator.

8. The seeding machine of claim 7, wherein the linkage is pivotally coupled to the main frame.

9. The seeding machine of claim 1, wherein the controller is mounted to the row unit.

10. The seeding machine of claim 1, wherein the controller is configured to increase the downforce on the row unit if the detected moisture level is below a predetermined threshold.

11. The seeding machine of claim 1, wherein the controller is configured to decrease the downforce on the row unit if the detected moisture level is above a predetermined threshold.

12. The seeding machine of claim 1, wherein the moisture sensor, the controller, and the actuator form a closed loop control, such that the moisture sensor continuously monitors moisture levels in the soil and send signals to the controller, and the actuator continuously adjusts a downforce on the row unit based on signals received from the controller.

13. The seeding machine of claim 1, wherein the row unit is one of a plurality of row units coupled to the main frame, wherein each row unit includes an associated actuator, and wherein the actuators are coupled to a single controller, such that the single controller controls each of the associated actuators individually.

14. The seeding machine of claim 13, wherein the moisture sensor is one of a plurality of moisture sensors that are each coupled to the single controller, and wherein each moisture sensor is associated with a different row unit.

15. A seeding machine comprising:
    a main frame;
    a row unit coupled to the main frame, the row unit having a row unit frame, a gauge wheel coupled to the row unit frame, and a furrow opener coupled to the row unit frame; and
    a downforce adjustment system for adjusting an amount of downforce applied to the row unit, the downforce adjustment system including a moisture sensor configured to detect a moisture level of soil, a controller configured to receive a signal from the moisture sensor corresponding to the detected moisture level, and an actuator configured to change the amount of downforce applied to the row unit based on the signal received by the controller,
    wherein the row unit is one of a plurality of row units coupled to the main frame, wherein the moisture sensor is a single moisture sensor, and wherein the downforce applied to each row unit is identical based on the moisture level detected by the single moisture sensor.

16. A seeding machine comprising:
    a main frame;
    a row unit coupled to the main frame, the row unit having a row unit frame; and a downforce adjustment system coupled to the row unit for adjusting an amount of downforce applied to the row unit, the downforce adjustment system including:
  a moisture sensor coupled to the row unit and configured to detect a moisture level of one or more layers of soil, the moisture sensor selected from a group consisting of a capacitive sensor, an infrared sensor, and a radar sensor;
  a controller configured to receive a signal from the moisture sensor corresponding to the detected moisture level;
  an actuator configured to change the amount of downforce applied to the row unit based on the signal received by the controller; and
  a linkage coupled to the actuator, the row unit frame, and the main frame, wherein the linkage is pivotally coupled to the main frame,
  wherein the row unit is one of a plurality of row units coupled to the main frame, and wherein each of the row units includes its own associated controller, its own associated moisture sensor, and its own associated actuator, such that each controller only communicates with the moisture sensor and the actuator associated of a single row unit.

17. The seeding machine of claim 16, wherein the controller is configured to increase the downforce on the row unit if the detected moisture level is below a predetermined threshold, and wherein the controller is configured to decrease the downforce on the row unit if the detected moisture level is above a predetermined threshold.

* * * * *